US011118973B2

(12) United States Patent
Bickham et al.

(10) Patent No.: US 11,118,973 B2
(45) Date of Patent: Sep. 14, 2021

(54) SPECTRAL FILTERING FOR RAMAN SPECTROSCOPY

(71) Applicant: Corning Incorporated, Corning, NY (US)

(72) Inventors: Scott Robertson Bickham, Corning, NY (US); Andrew Jay Effenberger, Jr., San Diego, CA (US); Mark Christian Sanson, Macedon, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/966,086

(22) PCT Filed: Feb. 8, 2019

(86) PCT No.: PCT/US2019/017190
§ 371 (c)(1),
(2) Date: Jul. 30, 2020

(87) PCT Pub. No.: WO2019/157266
PCT Pub. Date: Aug. 15, 2019

(65) Prior Publication Data
US 2021/0033461 A1 Feb. 4, 2021

Related U.S. Application Data

(60) Provisional application No. 62/628,627, filed on Feb. 9, 2018.

(51) Int. Cl.
*G01J 3/44* (2006.01)
*G01J 3/02* (2006.01)
*G01J 3/12* (2006.01)

(52) U.S. Cl.
CPC ............ *G01J 3/44* (2013.01); *G01J 3/027* (2013.01); *G01J 3/0208* (2013.01);
(Continued)

(58) Field of Classification Search
CPC .......... G01J 3/44; G01J 3/0208; G01J 3/0218; G01J 3/0227; G01J 3/0237; G01J 3/027;
(Continued)

(56) References Cited

U.S. PATENT DOCUMENTS 4,239,330 A 12/1980 Ashkin
4,239,331 A 12/1980 Aoyama
(Continued)

FOREIGN PATENT DOCUMENTS

JP 3858844 B2 12/2006

OTHER PUBLICATIONS

International Search Report and Written Opinion of the International Searching Authority; PCT/US2019/017190; dated May 16, 2019, 11 pages; European Patent Office.

*Primary Examiner* — Abdullahi Nur
(74) *Attorney, Agent, or Firm* — Annie J. Morgan

(57) ABSTRACT

A Raman spectroscopy system is provided. The spectroscopy system includes an optical switch including a first side having a pump inlet and a return outlet, and a second side having a plurality of pump outlets and a plurality of return inlets. The spectroscopy system includes at least one radiation source optically coupled to the pump inlet and a detector optically coupled to the return outlet. The spectroscopy system further includes a pump filter module optically coupled between the at least one radiation source and the pump outlets and a return filter module optically coupled between the detector and the return inlets. The spectroscopy system further includes a plurality of probes, each probe optically connected to at least one of the plurality of pump outlets by at least one excitation fiber and optically coupled to one of the return inlets by at least one emission fiber.

19 Claims, 3 Drawing Sheets

(52) U.S. Cl.
CPC ........... *G01J 3/0218* (2013.01); *G01J 3/0227* (2013.01); *G01J 3/0237* (2013.01); *G01J 3/0291* (2013.01); *G01J 3/12* (2013.01); *G01J 2003/1221* (2013.01)

(58) Field of Classification Search
CPC .... G01J 3/0291; G01J 3/12; G01J 2003/1221; G01J 2003/1213; G01N 21/65; G01N 21/64
See application file for complete search history.

(56) References Cited

U.S. PATENT DOCUMENTS

| | | | |
|---|---|---|---|
| 4,303,303 | A | 12/1981 | Aoyama |
| 4,322,126 | A | 3/1982 | Minowa et al. |
| 4,634,239 | A | 1/1987 | Buhrer |
| 5,361,315 | A | 11/1994 | Lewis et al. |
| 5,963,319 | A | 10/1999 | Jarvis et al. |
| 6,823,102 | B2 | 11/2004 | Zhao et al. |
| 6,897,951 | B2 | 5/2005 | Womble et al. |
| 7,944,555 | B2 | 5/2011 | Claps |
| 8,553,219 | B2 | 10/2013 | Patil et al. |
| 2012/0089030 | A1 | 4/2012 | Guze et al. |
| 2017/0205253 | A1* | 7/2017 | Handerek ............ G01H 9/004 |

* cited by examiner ary application under 35 U.S.C. § 371 of International Application No. PCT/US2019/017190 filed on Feb. 8, 2019, which claims the benefit of priority under 35 U.S.C § 120 of U.S. Provisional Application Ser. No. 62/628,627 filed on Feb. 9, 2018, the contents of which are relied upon and incorporated herein by reference in their entireties.

SPECTRAL FILTERING FOR RAMAN SPECTROSCOPY

CROSS-REFERENCE TO RELATED APPLICATION

This application is a National Stage application under 35 U.S.C. § 371 of International Application No. PCT/US2019/017190 filed on Feb. 8, 2019, which claims the benefit of priority under 35 U.S.C § 120 of U.S. Provisional Application Ser. No. 62/628,627 filed on Feb. 9, 2018, the contents of which are relied upon and incorporated herein by reference in their entireties.

FIELD

The present disclosure generally relates to optical devices and, more particularly, to optical switches including filtering components for use in Raman spectroscopy.

BACKGROUND

Optical switches are conventionally used for a variety of applications including fiber optic communications. Such switches are used to direct light from a desired optical input to a desired optical output. 1×N switches for example make optical connections between a common port and any one of N ports where "N" is an integer greater than 1. Conventional optical switches may include, for example, microelectromechanical systems (MEMs) and micromechanical systems based on moving prisms or moving optical fibers. Commercial examples of micromechican switches include the LightBend™ series manufactured by Agiltron (Woburn, Mass., USA).

Raman spectroscopy is an example of an application which can utilize fiber optical fibers to transmit and receive light. Raman spectroscopy provides a technique for analyzing samples that is considered suitable for aqueous and other liquid environments as well as for analyzing solids, gels, gases and powders. Raman spectroscopy is an analytical technique that uses light scattering to determine identities and concentrations of various molecules in a substance by illuminating the substance with monochromatic light and then measuring the individual wavelengths and their intensities in the scattered light.

Raman spectroscopy systems conventionally include probes which facilitate measuring Raman spectra of samples remote from a light source and a detector. The probe is optically connected to the light source through a first optical fiber and optically connected to the detector through a second optical fiber. Often the probe contains optical components including a narrow bandpass "laser clean-up" filter centered at the frequency of the laser and an edge, notch or high-pass filter that selectively rejects the light that is elastically scattered at the laser frequency.

Probes with such optical components are convenient for Raman spectroscopy systems with a single probe or with a limited number of probes. However, as the number of probes in the Raman spectroscopy system increases, with each probe including its own set of optical components, the overall cost of the system increases as well.

SUMMARY

According to an embodiment of the present disclosure, a Raman spectroscopy system is provided. The spectroscopy system includes an optical switch including a first side having a pump inlet and a return outlet, and a second side having a plurality of pump outlets and a plurality of return inlets. The spectroscopy system includes at least one radiation source optically coupled to the pump inlet of the optical switch and a detector optically coupled to the return outlet of the optical switch. The spectroscopy system further includes a pump filter module optically coupled between the at least one radiation source and the pump outlets of the optical switch and a return filter module optically coupled between the detector and the return inlets of the optical switch. The spectroscopy system further includes a plurality of probes, each probe optically connected to at least one of the plurality of pump outlets of the optical switch by at least one excitation fiber and optically coupled to one of the return inlets of the optical switch by at least one emission fiber.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1A:
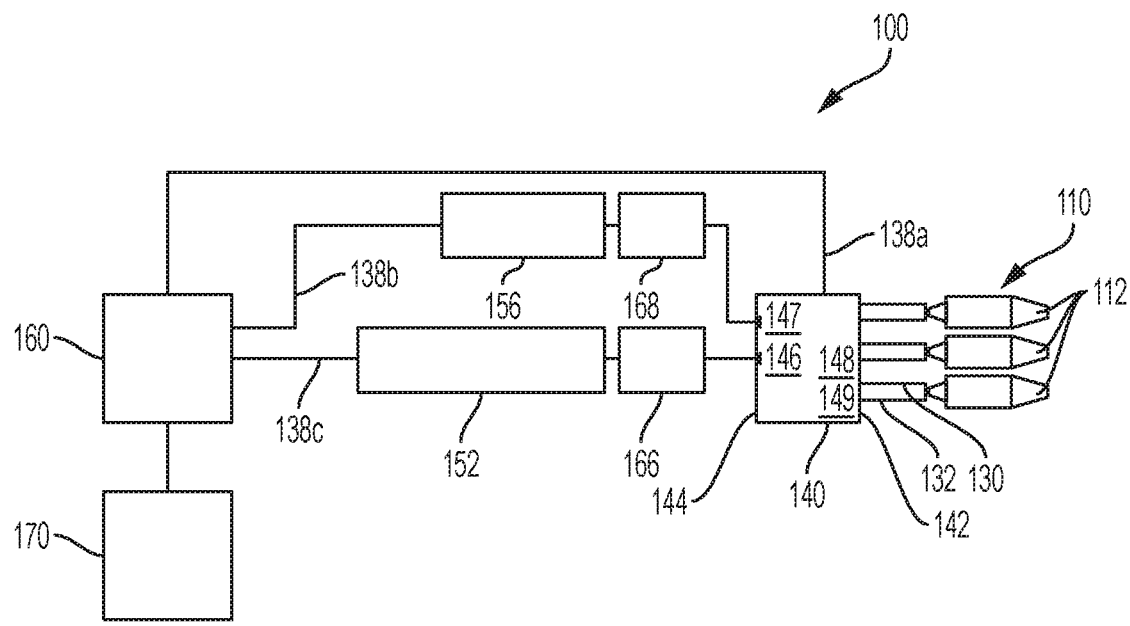
FIG. 1A illustrates an exemplary Raman spectroscopy system in accordance with embodiments of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

As used herein, "have," "having," "include," "including," "comprise," "comprising" or the like are used in their open ended sense, and generally mean "including, but not limited to."

All scientific and technical terms used herein have meanings commonly used in the art unless otherwise specified. The definitions provided herein are to facilitate understanding of certain terms used frequently herein and are not meant to limit the scope of the present disclosure.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Embodiments of the present disclosure provide Raman spectroscopy systems including an optical switch including a first side having a pump inlet optically coupled to at least one radiation source and a return outlet optically coupled to a detector. The optical switch further includes a second side having a plurality of pump outlets and a plurality of return inlets optically coupled to a plurality of probes. The spectroscopy systems described herein further include a pump filter module disposed between the at least one radiation source and the plurality of pump outlets such that all radiation delivered from the at least one radiation source passes through the pump filter module prior to being delivered to the probes. Additionally, the spectroscopy systems described herein also include a return filter module disposed between the detector and the plurality of return inlets such that all radiation delivered from the probes passes through the return filter module prior to being delivered to the detector. The spectroscopy systems described herein advantageously allow for filtering of radiation delivered to a plurality of probes and filtering of radiation delivered from a plurality of probes without providing conventional probe optical components in each of the plurality of probes. Thus the systems as described herein reduce the costs associated with analysis of multiple samples with multiple probes or of multiple portions of a sample with multiple probes.

FIGS. 1A-1B and 2A-2B show exemplary Raman spectroscopy systems in accordance with embodiments of the present disclosure. The exemplary system 100 shown in FIG. 1A includes a plurality of probes 110 and a plurality of optical fibers 130, 132 optically connecting each of the plurality of probes 110 to a first side 142 of an optical switch 140. For each of the plurality of probes 110, at least one excitation fiber 130 optically connects the probe 110 to a pump outlet 148 on the first side 142 of the optical switch 140 and at least one emission fiber 132 optically connects the probe 110 to a return inlet 149 on the first side 142 of the optical switch 140. The first side 142 of the optical switch 140 includes a plurality of pump outlets 148 and a plurality of return inlets 149. At least one radiation source 152 is optically connected, through a pump filter module 166, to a pump inlet 146 on a second side 144 of the optical switch 140 and a detector 156 is optically connected, through a return filter module 168, to a return outlet 147 on the second side 144 of the optical switch 140. The system 100 further includes a controller 160 and a computing system 170.

Figure 1B:
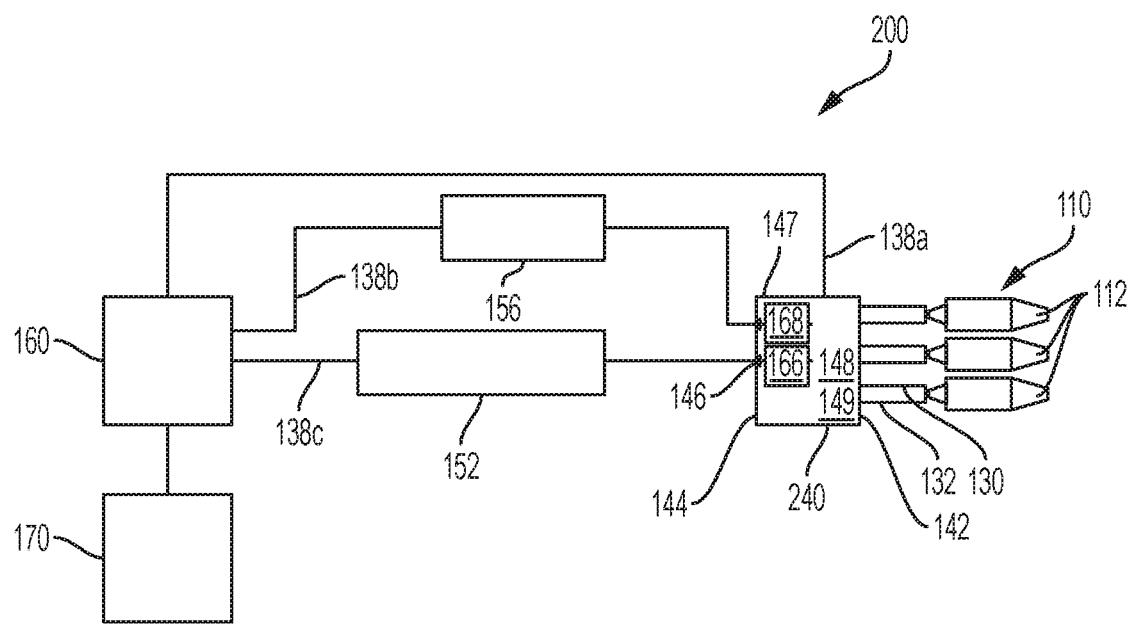
FIG. 1B illustrates an exemplary Raman spectroscopy system in accordance with embodiments of the present disclosure.

The exemplary system 200 shown in FIG. 1B includes similar system components as system 100 and differs from system 100 in that it includes optical switch 240. Optical switch 240 includes pump filter module 166 disposed within the optical switch 240 between the pump inlet 146 and the plurality of pump outlets 148. Optical switch 240 also includes return filter module 168 disposed within the optical switch 240 between the return outlet 147 and the plurality of return inlets 149. As such, in system 200, the at least one radiation source 152 is optically connected directly to the pump inlet 146. The system 100 further includes a controller 160 and a computing system 170.

Figure 2A:
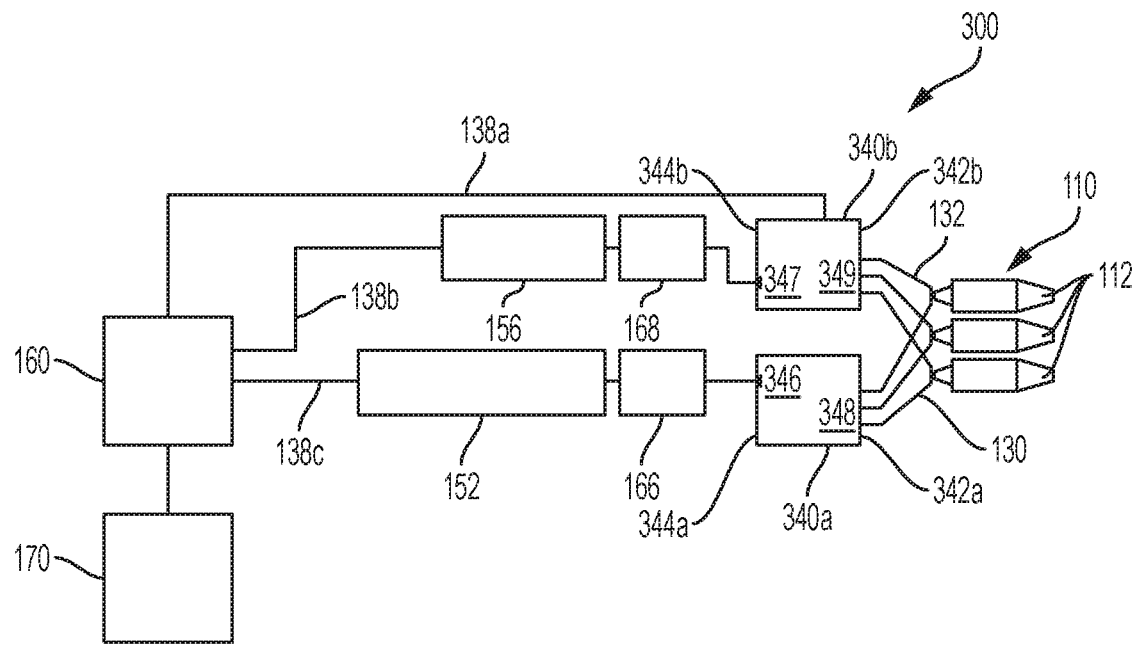
FIG. 2A illustrates an exemplary Raman spectroscopy system in accordance with embodiments of the present disclosure.

The exemplary system 300 shown in FIG. 2A includes a plurality of probes 110, a pump optical switch 340a and a return optical switch 340b. For each of the plurality of probes 110, at least one excitation fiber 130 optically connects the probe 110 to a pump outlet 348 on the first side 342a of the pump optical switch 340a and at least one emission fiber 132 optically connects the probe 110 to a return inlet 349 on the first side 342b of the return optical switch 340b. The first side 342a of the pump optical switch 340a includes a plurality of pump outlets 348 and the first side 342b of the return optical switch 340b includes a plurality of return inlets 349. At least one radiation source 152 is optically connected, through a pump filter module 166, to a pump inlet 346 on a second side 344a of the pump optical switch 340a and a detector 156 is optically connected, through a return filter module 168, to a return outlet 347 on the second side 344b of the return optical switch 340b. The system 100 further includes a controller 160 and a computing system 170.

Figure 2B:
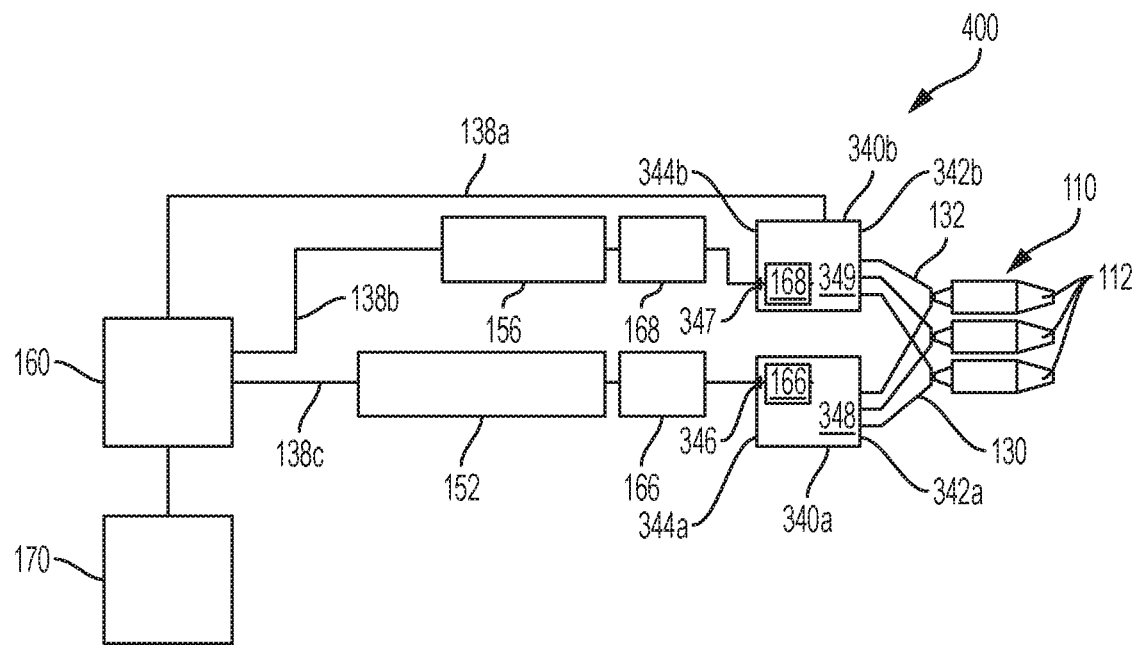
FIG. 2B illustrates an exemplary Raman spectroscopy system in accordance with embodiments of the present disclosure.

The exemplary system 400 shown in FIG. 2B includes similar system components as system 300 and differs from system 300 in that it includes pump optical switch 440a and return optical switch 440b. Pump optical switch 440a includes pump filter module 166 disposed within the pump optical switch 440a between the pump inlet 346 and the plurality of pump outlets 348. Return optical switch 440b includes return filter module 168 disposed within the return optical switch 440b between the return outlet 347 and the plurality of return inlets 349. As such, in system 400, the at least one radiation source 152 is optically connected directly to the pump inlet 346.

The at least one radiation source 152 as described herein may be, for example, a commercially available laser having an output wavelength from about 200 nm to about 1550 nm. The output wavelength may be in the ultra-violet region of the electromagnetic spectrum between about 200 nm and about 400 nm, for example about 244 nm, about 257 nm, about 266 nm, about 325 nm or about 364 nm. The output wavelength may be in the visible region of the electromagnetic spectrum between about 400 nm and about 700 nm, for example about 457 nm, about 473 nm, about 488 nm, about 514 nm, about 532 nm, about 633 nm or about 660 nm. The output wavelength may be in the near-infrared region of the electromagnetic spectrum between about 700 nm and about 1500 nm, for example about 785 nm, about 830 nm, about 980 nm or about 1064 nm. For example, the at least one radiation source 152 as described herein may have an output wavelength of between about 400 nm and about 850 nm. It should be appreciated that the output wavelength of the at least one radiation source 152 may be selected based on the material being analyzed with the system 100, 200, 300, 400. For example, a relatively long wavelength such as about 850 nm may be more suitable for analyzing liquids which tend to fluoresce, whereas relatively shorter wavelengths such as about 660 nm or 785 nm may be more suitable for analyzing materials when higher efficiency of the Raman scattering process is desirable.

Figure 3:
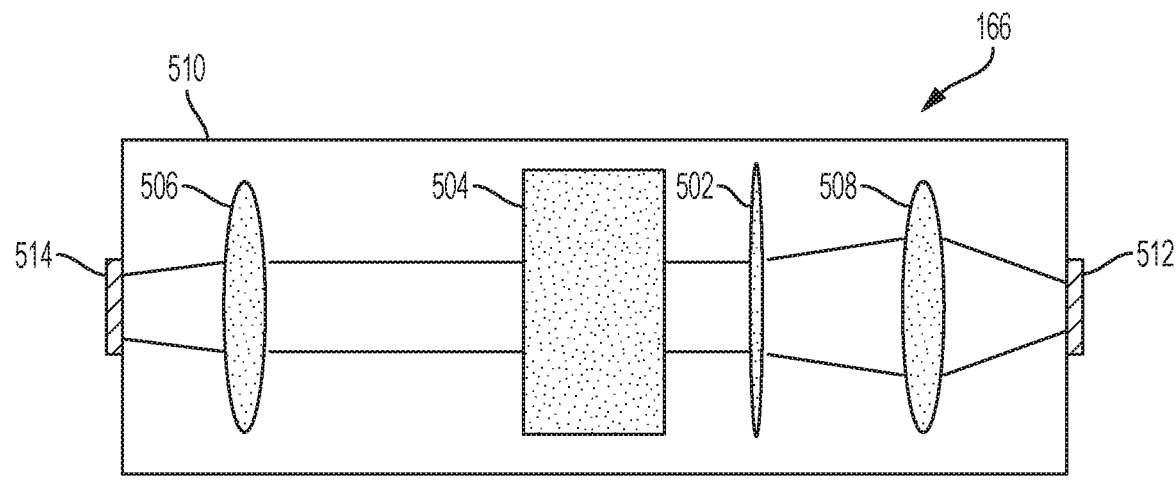
FIG. 3 illustrates an exemplary pump filter module in accordance with embodiments of the present disclosure.

FIG. 3 illustrates a pump filter module as described herein. According to embodiments of the present disclosure, the pump filter module 166 may include a housing 510 having an input 512 at a first end and an output 514 at a second end which is an opposite end of housing 510 as the first end. The housing input 512 may be optically coupled to the at least one radiation source 152. In system 100 the housing output 514 may be optically coupled to the pump inlet 146 of optical switch 140. Similarly, in system 300, the housing output 514 may be optically coupled to the pump inlet 346 of pump optical 340*a*. In system 200, the housing output 514 may be optically coupled to an optical connection within the optical switch 240 which delivers radiation in the direction of the plurality of pump outlets 148. Similarly, in system 400, the housing output 514 may be optically coupled to an optical connection within the pump optical switch 440*a* which delivers radiation in the direction of the plurality of pump outlets 348. Between the housing input 512 and the housing output 514, the pump filter module 166 includes a band-pass filter 504 positioned between a collimator 502 and a focusing lens 506. The band-pass filter 504 may be operable at any suitable wavelength matched to allow only the excitation wavelength to pass, but as an example is selected to allow only radiation with a 785 nm wavelength to pass through. The collimator 502 collimates the radiation before it enters the band-pass filter 504. After the band-pass filter 504, the focusing lens 506 focuses the radiation to the optical connection coupled to the housing outlet 514. Optionally, and as shown in FIG. 3, the pump filter module 166 may include a second focusing lens 508 positioned between the housing input 512 and the collimator 502. The second focusing lens 508 may be included to focus radiation from the at least one radiation source 152 to the collimator 502.

Figure 4:
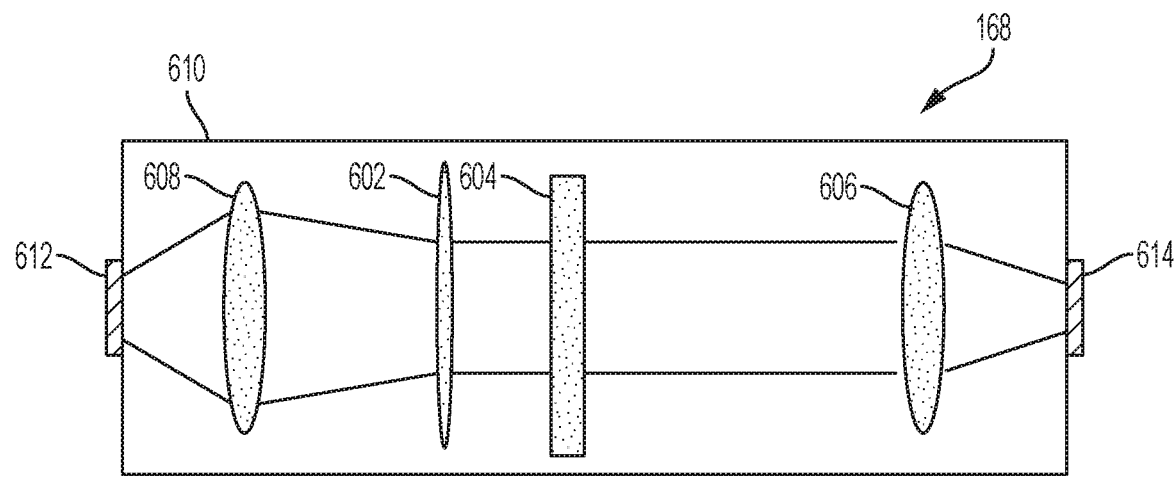
FIG. 4 illustrates an exemplary return filter module in accordance with embodiments of the present disclosure.

FIG. 4 illustrates a return filter module as described herein. According to embodiments of the present disclosure, the return filter module 168 may include a housing 610 having an input 612 at a first end and an output 614 at a second end which is an opposite end of housing 610 as the first end. The housing output 614 may be optically coupled to the detector 156 and, in system 100, the housing input 614 may be optically coupled to the return outlet 147 of optical switch 140. Similarly, in system 300, the housing input 614 may be optically coupled to the return outlet 347 of return optical switch 340*b*. In system 200, the housing output 614 may be optically coupled to an optical connection within the optical switch 240 which delivers radiation from the plurality of return inlets 149. Similarly, in system 400, the housing output 614 may be optically coupled to an optical connection within the pump optical switch 440*b* which delivers radiation from the plurality of return inlets 349. Between the housing input 612 and the housing output 614, the return filter module 168 includes a filter 604 positioned between a collimator 602 and a focusing lens 606. The filter 604 may be for example, but not limited to, an edge filter, a long-pass, or notch filter. Where the filter 604 is an edge filter or a long pass filter, the filter 604 is selected to block an excitation signal wavelength but allow radiation of longer or shorter wavelengths to pass through. Where the filter 604 is a notch filter, the filter 604 is selected to block an excitation signal wavelength but allow radiation at both longer and shorter wavelengths to pass through. As used herein, the term "excitation signal" refers to radiation delivered to the plurality of probes 110 by the at least on radiation source 152 and "excitation signal wavelength" refers to the wavelength of the radiation delivered to the plurality of probes 110 by the at least on radiation source 152. For example, where the at least on radiation source 152 delivers radiation having a wavelength of 785 nm, the long-pass filter is adapted to block radiation with a 785 nm wavelength from passing through. The collimator 602 collimates the radiation before the long-pass filter 604. After the long-pass filter 604, the focusing lens 606 focuses the radiation to the optical connection coupled to the housing outlet 614. Optionally, and as shown in FIG. 4, the return filter module 168 may include a second focusing lens 608 positioned between the housing input 612 and the collimator 602. The second focusing lens 608 may be included to focus radiation from the plurality of probes 110 to the collimator 602.

According to embodiments of the present disclosure, system 100, 200 operates to deliver radiation from the at least one radiation source 152 into the optical switch 140, 240 through the pump inlet 146. In response to a control signal from controller 160, the optical switch 140, 240 forms a connection between the pump inlet 146 and at least one of the plurality of pump outlets 148 such that radiation is delivered from the optical switch 140, 240 to at least one of the plurality of probes 110 through at least one excitation fiber 130. The plurality of probes 110 deliver radiation from the at least on radiation source 152 to a sample and radiation scattered by the sample is collected by the plurality of probes 110 and returned to the plurality of return inlets 149 of the optical switch 140, 240 through at least one emission fiber 132. In response to a control signal from controller 160, the optical switch 140, 240 forms a connection between at least one of the plurality of return inlets 149 and the return outlet 147 such that radiation is delivered from the optical switch 140, 240 to the detector 156.

According to embodiments of the present disclosure, system 300, 400 operates to deliver radiation from the at least one radiation source 152 into the pump optical switch 340*a*, 440*a* through the pump inlet 346. In response to a control signal from controller 160, the pump optical switch 340*a*, 440*a* forms a connection between the pump inlet 346 and at least one of the plurality of pump outlets 348 such that radiation is delivered from the pump optical switch 340*a*, 440*a* to at least one of the plurality of probes 110 through at least one excitation fiber 130. The plurality of probes 110 deliver radiation from the at least on radiation source 152 to a sample and radiation scattered by the sample is collected by the plurality of probes 110 and returned to the plurality of return inlets 349 of return optical switch 340*b*, 440*b* through at least one emission fiber 132. In response to a control signal from controller 160, the return optical switch 340*b*, 440*b* forms a connection between at least one of the plurality of return inlets 349 and the return outlet 347 such that radiation is delivered from the return optical switch 340*b*, 440*b* to the detector 156.

The optical switch 140, 240, 340*a*, 340*b*, 440*a*, 440*b* as described herein may be any optical switch known in the art. For example, the optical switch 140, 240, 340*a*, 340*b*, 440*a*, 440*b* may be a mechanical optical switch such as is described in U.S. Pat. Nos. 4,239,330, 4,239,331, 4,322,126 and 4,303,303, the contents of which are incorporated herein by reference in their entirety. Optionally, the optical switch 140, 240, 340*a*, 340*b*, 440*a*, 440*b* may be a multiple optical fiber electromechanical switch such as is described in U.S. Pat. No. 4,634,239 the contents of which are incorporated herein by reference in its entirety. Optionally, the optical switch 140, 240, 340*a*, 340*b*, 440*a*, 440*b* may be a refractive element optical transmission switch such as is described in U.S. Pat. No. 5,361,315, the contents of which are incorporated herein by reference in its entirety.

Embodiments of the present disclosure may include a plurality of probes 110 each having an optical head assembly 112 configured to direct excitation radiation to a sample and to collect radiation scattered by the sample. The optical head assembly 112 is optically connected to at least one excitation fiber 130 through which an excitation signal is directed from the at least one radiation source 152. The optical head assembly 112 is further optically connected to at least one emission fiber 132. Radiation scattered by a sample in response to the excitation signal is collected at the optical head assembly 112 and delivered to the at least one emission fiber 132.

According to embodiments of the present disclosure, the optical head assembly 112 may include an input and an output separate from the input. The at least one excitation fiber 130 may be optically connected to the input of the optical head assembly 112 by, for example, an optical fiber connector, and the at least one emission fiber 132 may be optically connected to the output of the optical head assembly 112 by, for example, an optical fiber connector. Alternatively, the optical head assembly 112 may include a port optically connected to an optical fiber bundle. The optical fiber bundle may be optically coupled to the port of the optical head assembly 112 by, for example, an optical fiber connector. As one example, the optical fiber bundle may include one or more excitation fibers 130 and a plurality of emission fibers 132 around the circumference of the one or more excitation fibers 130.

It is generally understood that the greater the number of emission fibers 132 within the optical fiber bundle the greater the amount of scattered radiation that can be communicated from the plurality of probes 110 to the detector 156. While the optical fiber bundle described herein may include any number of emission fibers 132, the optical fiber bundle as described herein may include two or more emission fibers 132, for example, between about 2 and about 10 emission fibers 132, or between about 3 and about 8 emission fibers 132 and all values therebetween. Furthermore, the amount of scattered radiation that can be communicated from the plurality of probes 110 to the detector 156 decreases as the separation between the fibers of the optical fiber bundle is increased. Thus the optical fiber bundle as described herein includes a configuration which minimizes spacing between the fibers in the optical fiber bundle. For example, the ends of the fibers where the optical fiber connects to the optical head assembly 112 may be in direct contact with each other.

In accordance with embodiments of the present disclosure, the system 100, 200, 300, 400 may include a detector 156. The detector 156 may be optically connected, through the return filter module 168, to a return outlet 147, 347 to enable scattered radiation from the sample to be transmitted onto a slit of the detector 156. The detector 156 may be a charged coupled device (CCD) based sensor that quantizes and outputs the spectral data as an array of intensities at different wavelengths. Other exemplary detectors may include Focal Plane Array detectors such as a Complementary Metal Oxide Semiconductor (CMOS) detector, and Photodiode Array detectors such as an Si detector and an InGaAs detector.

In accordance with embodiments of the present disclosure, the system 100, 200, 300, 400 may further include a controller 160 configured to provide an interface for connecting the various components of the system 100, 200, 300, 400 to a computing system, such as a personal computer. The controller 160 may be configured to control the operation of the various components of the system 100, 200, 300, 400. For example, in system 100, 200 the controller 160 is configured to control the optical switch 140, 240 or in system 300, 400 the controller is configured to control the pump optical switch 340a, 440a and the return optical switch 340b, 440b. Controller 160 communicates a control signal to an embedded computer of optical switch 140, 240, 340a, 440a specifying at least one excitation fiber 130 through which radiation is to be delivered. In response to the control signal, the optical switch 140, 240, 340a, 440a forms a connection between the pump inlet 146, 346 and at least one of the plurality of pump outlets 148, 348 such that radiation is delivered from the optical switch 140, 240, 340a, 440a to at least one of the plurality of probes 110 through at least one excitation fiber 130. Similarly, controller 160 communicates a control signal to an embedded computer of optical switch 140, 240, 340b, 440b specifying at least one emission fiber 132 from which scattered radiation is to be delivered. In response to the control signal, the optical switch 140, 240, 340b, 440b forms a connection between at least one of the plurality of return inlets 149, 349 and the return outlet 147, 347 such that radiation is delivered from the optical switch 140, 240, 340b, 440b to the detector 156.

For example, the controller 160 may be configured to control the at least one radiation source 152 to turn the at least one radiation source 152 on and off as well as to control the output power of the at least one radiation source 152. The controller 160 may also be configured to control the power to the detector 156 to turn the detector on and off and to read Raman spectra data as well as to receive the spectra data signals. Additionally, the controller 160 may transmit control signals to the detector 156 to forward Raman spectra data to a computing system for further processing and analysis. The optical switch 140, 240, 340a, 340b, 440a, 440b, the at least one radiation source 152, and/or the detector 156 may be directly coupled to the controller 160 through a wired interface, such as Universal Serial Bus (USB), Firewire, serial (RS232) or parallel interface, or may be coupled to the controller 160 through a wireless interface, such as Wi-Fi, Blue Tooth, or ZigBee.

The controller 160 can be a dedicated device based upon an application specific integrated circuit (ASIC), programmable array or programmable micro controller. Alternatively, the controller 160 can be an interface which controls and converts signals for transfer between the components of the system and the computing system. The controller 160 can include analog to digital conversion functions to convert Raman spectra signals from the detector 156 to digital data signals transferred to the computing system.

The computing system 170 can include a CPU or processor and associated memory, including RAM, ROM, volatile and non-volatile memory for storing and executing programs and storing data. The computing system 170 can include programs for reading in, storing and displaying Raman spectra data received from the detector 156, performing analysis and processing of the Raman spectra data and for comparing the received Raman spectra data with stored Raman spectra data. The Raman spectra data can be displayed in the form of graphs and tables.

While the present disclosure includes a limited number of embodiments, those skilled in the art, having benefit of this disclosure, will appreciate that other embodiments can be devised which do not depart from the scope of the present disclosure.

What is claimed is:

1. A Raman spectroscopy system comprising:
   an optical switch comprising:
   a first side having a pump inlet and a return outlet, and
   a second side having a plurality of pump outlets and a plurality of return inlets;
   at least one radiation source optically coupled to the pump inlet of the optical switch;
   a detector optically coupled to the return outlet of the optical switch;
   a pump filter module optically coupled between the at least one radiation source and the pump outlets of the optical switch;

a return filter module optically coupled between the detector and the return inlets of the optical switch; and a plurality of probes, each probe optically connected to at least one of the plurality of pump outlets of the optical switch by at least one excitation fiber and optically coupled to one of the return inlets of the optical switch by at least one emission fiber.

2. The spectroscopy system of claim 1, wherein the optical switch comprises a pump optical switch and a return optical switch, wherein the pump optical switch comprises the pump inlet and the plurality of pump outlets, and wherein the return optical switch comprises the plurality of return inlets and the return outlet.

3. The spectroscopy system of claim 1 or 2, wherein the pump filter module comprises a housing disposed between the at least one radiation source and the pump inlet of the optical switch.

4. The spectroscopy system of claim 1, wherein the return filter module comprises a housing disposed between the detector and the return outlet of the optical switch.

5. The spectroscopy system of claim 1, wherein the at least one radiation source comprises a laser.

6. The spectroscopy system of claim 5, wherein the laser has an output wavelength of between about 200 nm and about 1500 nm.

7. The spectroscopy system of claim 5, wherein the laser has an output wavelength of between about 670 nm and about 850 nm.

8. The spectroscopy system of claim 1, wherein the pump filter module comprises a band-pass filter disposed between a collimator and a focusing lens.

9. The spectroscopy system of claim 8, wherein the pump filter module further comprises a second focusing lens and wherein the collimator is disposed between the band-pass filter and the second focusing lens.

10. The spectroscopy system of claim 1, wherein the return filter module comprises a long-pass filter disposed between a collimator and a focusing lens.

11. The spectroscopy system of claim 10, wherein the return filter module further comprises a second focusing lens and wherein the collimator is disposed between the long-pass filter and the second focusing lens.

12. The spectroscopy system of claim 1, comprising an optical fiber bundle having a plurality of the emission fibers around the circumference of the at least one excitation fiber.

13. The spectroscopy system of claim 12, wherein the optical fiber bundle comprises 2 or more emission fibers.

14. The spectroscopy system of claim 12, wherein the optical fiber bundle comprises between about 2 and about 10 emission fibers.

15. The spectroscopy system of claim 1, wherein the detector comprises a charged coupled device (CCD) based sensor.

16. The spectroscopy system of claim 1 further comprising a controller.

17. The spectroscopy system of claim 16, wherein the controller communicates a control signal to the optical switch, and wherein in response to the control signal, the optical switch either (a) forms a connection between the pump inlet and at least one of the plurality of pump outlets, or (b) forms a connection between at least one of the plurality of return inlets and the return outlet.

18. The spectroscopy system of claim 1, wherein radiation from the at least one radiation source is delivered to the optical switch through the pump inlet and further delivered out of one of the plurality of pump outlets to at least one of the plurality of probes through one of the at least one excitation fibers.

19. The spectroscopy system of claim 18, wherein radiation scattered by the sample is collected in the one of the plurality of probes and delivered to the optical switch through one of the plurality of return inlets and further delivered out of the return outlet to the detector.

* * * * *

UNITED STATES PATENT AND TRADEMARK OFFICE
CERTIFICATE OF CORRECTION

PATENT NO. : 11,118,973 B2  
APPLICATION NO. : 16/966086  
DATED : September 14, 2021  
INVENTOR(S) : Scott Robertson Bickham et al.

Page 1 of 1

It is certified that error appears in the above-identified patent and that said Letters Patent is hereby corrected as shown below:

In the Claims

In Column 9, Line 13 (approx.), Claim 3, delete "claim 1 or 2," and insert -- claim 1, --, therefor.

In Column 10, Line 17 (approx.), Claim 16, delete "claim 1" and insert -- claim 1, --, therefor.

Signed and Sealed this  
Twenty-eighth Day of January, 2025

Coke Morgan Stewart  
*Acting Director of the United States Patent and Trademark Office*